United States Patent [19]

Morgan

[11] 4,025,494

[45] May 24, 1977

[54] PROCESS FOR PREPARING FILM- AND FIBER-FORMING POLY(1,4-BENZAMIDE)

[75] Inventor: Paul Winthrop Morgan, West Chester, Pa.

[73] Assignee: E. I. Du Pont de Nemours and Company, Wilmington, Del.

[22] Filed: Sept. 8, 1975

[21] Appl. No.: 611,215

[52] U.S. Cl. ............................................. 260/78 A
[51] Int. Cl.² ........................................ G08G 69/12
[58] Field of Search ................................. 260/78 A

[56] References Cited

UNITED STATES PATENTS

| 3,063,966 | 11/1962 | Kwolek et al. | 260/78 R |
|---|---|---|---|
| 3,203,933 | 8/1965 | Huffman et al. | 260/78 A |
| 3,225,011 | 12/1965 | Preston et al. | 260/78 A |
| 3,240,758 | 3/1966 | Smith et al. | 260/78 A |

FOREIGN PATENTS OR APPLICATIONS 901,159   7/1962   United Kingdom

*Primary Examiner*—Harold D. Anderson

[57] ABSTRACT

A novel process for the preparation of high molecular weight poly(1,4-benzamide) from a p-aminobenzoyl halide salt in selected reaction media and in the presence of a heterocyclic tertiary amine acid acceptor or ethyl diisopropylamine.

9 Claims, No Drawings

PROCESS FOR PREPARING FILM- AND FIBER-FORMING POLY(1,4-BENZAMIDE)

BACKGROUND OF THE INVENTION

Preston et al. U.S. Pat. No. 3,225,011 demonstrates preparation of poly-p-aminobenzoic acid by a slurry polymerization technique in which a cyclic ether and a proton acceptor are employed. Kwolek U.S. Pat. No. 3,600,350 teaches the solution preparation of poly(1,4-benzamide) and copolymers of poly(1,4-benzamide) wherein up to 20 mole % of copolymeric units may be derived from halogen-substituted derivatives of 4-aminobenzoyl chloride hydrochloride, e.g., 2-chloro-4-aminobenzoyl chloride hydrochloride.

Caldwell et al. U.S. Pat. No. 3,408,334 teaches the preparation of polyamides by condensing aromatic amino acids in the presence of a catalytic amount of a tin compound. Jones U.S. Pat. No. 3,753,957 teaches preparation of aromatic polyamides by condensing an aromatic ester of an aromatic amino acid to an oligomer which is then polymerized to a high viscosity product. New systems for preparing poly(1,4-benzamide) of high molecular weight are worthwhile objectives.

SUMMARY OF THE INVENTION

This invention provides novel processes for preparing high molecular weight, fiber- and film-forming poly(1,4-benzamide) by reacting a p-aminobenzoyl halide salt of the formula

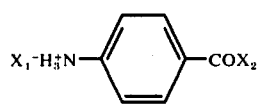

(I)

wherein $X_1$ and $X_2$ represent halogen radicals, preferably bromide or chloride, in a liquid medium hereinafter specified, together with a heterocyclic tertiary amine acid acceptor.

DESCRIPTION OF THE PREFERRED EMBODIMENTS

Monomers

The formula I monomers preferred for use in this invention are p-aminobenzoyl bromide hydrobromide, p-aminobenzoyl chloride hydrobromide, and p-aminobenzoyl chloride hydrochloride. These monomers may be prepared by known procedures and are stored under anhydrous conditions prior to being used.

Acid Acceptors

Not all tertiary amines are operable in the process of the invention. Heterocyclic tertiary amine acid acceptors are useful and preferred among them are pyridine; 2,6-lutidine; 2,4-lutidine; 2,5-lutidine; 3,5-lutidine; 2,3-lutidine; with pyridine being most preferred. Ethyl diisopropylamine is also suitable. These acceptors form salts with the hydrogen chloride and/or hydrogen bromide by-products of the polymerization and are used in sufficient quantity to react with all the acidic by-product generated.

Liquid Reaction Media

Not all liquid media are operable for the production of the high molecular weight polymers. The liquids useful in the process of this invention to provide a medium for the polymerization reaction include chloro-, bromo-, and nitro-benzene, and orthodichlorobenzene; n-pentane, n-hexane, n-heptane and cyclohexane, acetonitrile, propionitrile, and benzonitrile; acetone, methyl ethyl ketone and ethyl acetate, diethyl ether, ethylene glycol dimethyl ether, and diethylene glycol dimethyl ether; methylene chloride, chloroform, carbon tetrachloride, chlorobromethane, 1-chloro-2-bromoethane; ethylene dichloride, 1,1,2-trichloroethane; and unsym.-trichlorotrifluoroethane (Freon-113). The aliphatic hydrocarbons are most preferred.

Polymerization Conditions; Shaped Article Preparation

The polymerization processes of this invention are carried out by reacting an appropriate monomer or mixture of monomers in a specified liquid reaction medium containing a heterocyclic tertiary amine acid acceptor or ethyl diisopropylamine. In practice the monomer(s) is placed in a dry polymerization vessel equipped with a stirrer, optionally swept with an inert gas, such as nitrogen, together with a liquid reaction medium selected from the aforementioned grouping. These are cooled, e.g., in a bath of solid carbon dioxide/acetone, solid carbon dioxide, or wet ice, and the acid acceptor added quickly, with stirring, to the polymerization vessel. The cooling bath is usually removed a short time later, e.g., 15–30 min.; stirring is usually continued for up to 2 hr. or more. The contents of the polymerization vessel are then combined with a polymer non-solvent, e.g., water, and the solid polymer product isolated, washed well with water, and dried in vacuo.

The temperature during polymerization can be allowed to go as high as 50° C but higher molecular weights are obtained by lowering the temperature to 30° C or below. There are limits on temperature imposed by the boiling and freezing points of the solvents; ether, ethyl acetate and methylene chloride are low-boiling solvents. These temperatures are modified by the presence of the acid acceptor.

In these processes, at least 2 moles of acid acceptor, preferably 3 to 15 moles, are used per mole of monomeric formula I salt(s). The volume of liquid reaction medium should be equal to or greater than the volume of acid acceptor, and preferably is at least twice the volume of said acid acceptor.

The poly(1,4-benzamide) thus obtained is of film- and fiber-forming molecular weight and exhibits an inherent viscosity of at least about 0.7, preferably at least 1.0 when measured as described hereinafter. It is soluble in concentrated sulfuric acid (e.g., 96-1.02% $H_2SO_4$) from solutions of which it can be extruded into useful fibers and films.

EXAMPLES

The following nonlimiting examples are illustrative of the practice of the preferred embodiments of this invention. In these examples, inherent viscosity ($\eta_{inh}$) has been determined in accordance with the following equation $$\eta_{inh} = \frac{\ln(\eta_{rel})}{C}$$

wherein ($\eta_{rel}$) represents the relative viscosity, (C) represents a concentration of 0.5 gram of the polymer in 100 ml. of the solvent. The relative viscosity ($\eta_{rel}$) is determined by dividing the flow time in a capillary viscometer of a dilute solution of the polymer by the flow time for the pure solvent. The dilute solution used herein for determining ($\eta_{rel}$) is of the concentration expressed by (C) above; flow times are determined at 30° C, using concentrated (95–98%) sulfuric acid as a solvent.

EXAMPLE 1

This example illustrates preparation of poly(1,4-benzamide) by the process of this invention, using chlorobenzene as the reaction medium and pyridine as the acid acceptor.

To a mixture of chlorobenzene (50 ml) and p-aminobenzoyl chloride hydrochloride (6.4 g, 0.033 mole), stirred under nitrogen and cooled in a bath of solid carbon dioxide, is added pyridine (10 ml.; added within 2-4 sec. time). The cooling bath is removed in 15 minutes; stirring is continued for 2 hr. The reaction mixture is combined with water, and the solid poly(1,4-benzamide) product isolated, washed well with water, and dried in vacuo. There is obtained 3.87 g, polymer, $\eta_{inh} = 1.38$.

EXAMPLE 2

Summarized in the following Table are other preparations of poly(1,4-benzamide) carried out by the procedure described in Example 1. Included in the Table for each synthesis is the reaction medium employed. In each synthesis, the monomer is p-aminobenzoyl chloride hydrochloride (0.033 mole) and unless otherwise noted, the cooling bath is solid carbon dioxide and the acid acceptor is pyridine (10 ml).

mole). To these stirred ingredients, under nitrogen, is added pyridine (75 ml). The cooling bath is removed in 15 minutes and the reaction mixture stirred for 2 hr. before being allowed to stand overnight at room temperature. The solid product is then filtered off, washed well with water, and dried to yield poly(1,4-benzamide), 19.6 g, $\eta_{inh} = 4.5$.

I claim:
1. A process for preparing high molecular weight fiber- and film-forming poly(1,4-benzamide) comprising reacting a p-aminobenzoyl halide salt of the formula

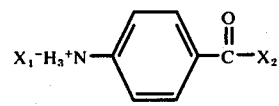

wherein $X_1$ and $X_2$ represent halogen radicals in a liquid reaction medium selected from the group consisting of chloro-, bromo-, nitro- and o-dichlorobenzene, n-pentane, n-hexane, n-heptane and cyclohexane, acetonitrile, propionitrile and benzonitrile, acetone, methyl ethyl ketone and ethyl acetate, diethyl ether, ethylene glycol dimethyl ether and diethylene glycol dimethyl ether, methylene chloride, carbon tetrachloride and chlorobromomethane, 1-chloro-2-bromoethane, ethylene dichloride, 1,1,2-trichloroethane and unsym.-trichlorotrifluoroethane in the presence of a tertiary

TABLE

SYNTHESES OF POLY(1,4-BENZAMIDE)

| ITEM | REACTION MEDIUM | POLY(1,4-BENZAMIDE) Yield, g. | $\nu_{inh}$ | Comment |
|------|-----------------|-------------------------------|-------------|---------|
| A | bromobenzene | 3.7 | 1.3 | |
| B | nitrobenzene | 4.6 | 2.2 | wet ice cooling; 15 ml. pyridine used, polymer washed with 2B-alcohol and water |
| C | o-dichlorobenzene | 3.1 | 0.94 | |
| D | n-pentane | 4.8 | 3.8 | 15 ml. pyridine used; dry ice/acetone cooling |
| E | n-hexane | 3.7 | 3.7 | |
| F | n-heptane | 3.9 | 0.81 | 15 ml. pyridine overnight standing after 2 hr. stirring |
| G | acetonitrile | 4.0 | 3.6 | |
| H | propionitrile | 3.8 | 1.1 | |
| I | benzonitrile | 4.0 | 2.2 | |
| J | acetonitrile | 4.0 | 0.7 | acceptor is 2,6-lutidine |
| K | acetone | 4.0 | 1.5 | |
| L | methyl ethyl ketone | 3.8 | 1.3 | |
| M | ethyl acetate | 4.0 | 1.0 | |
| N | diethyl ether | 3.7 | 1.1 | |
| O | ethylene glycol dimethyl ether | 3.6 | 1.1 | 15 ml. pyridine used; after 2 hr. stirring, mixture stood overnight at room temp. before being worked up |
| P | diethylene glycol dimethyl ether | 3.9 | 0.9 | 15 ml. pyridine used, after 2 hr. stirring, mixture stood overnight at room temp. before being worked up |
| Q | chloroform | 4.1 | 2.5 | |
| R | carbon tetrachloride | 3.5 | 1.5 | |
| S | methylene chloride | 4.0 | 2.2 | |
| T | bromochloromethane | 4.4 | 2.0 | |
| U | 1-bromo-2-chloroethane | 4.1 | 1.5 | |
| V | ethylene dichloride | 4.0 | 1.9 | |
| W | 1,1,2-trichloroethane | 4.1 | 1.7 | |
| X | unsym.-trichlorotrifluoroethane | 4.3 | 2.0 | (medium is Freon-113) |
| Y | cyclohexane | 4.0 | 2.31 | |

EXAMPLE 3

This example illustrates preparation of high molecular weight poly(1,4-benzamide) in n-hexane.

In an ice-cooled 1-liter resin kettle equipped with a disc-stirrer are placed n-hexane (250 ml) and p-aminobenzyly chloride hydrochloride (32 g, 0.17 amine acid acceptor selected from the group consisting of ethyl diisopropylamine and heterocyclic tertiary amine acid acceptors selected from the group consisting of pyridine, 2,6-lutidine, 2,4-lutidine, 2,5-lutidine, 3,5-lutidine and 2,3-lutidine.

2. The process of claim 1 wherein the p-aminobenzoyl halide salt is p-aminobenzoyl chloride hydrochloride.

3. The process of claim 1 wherein the acid acceptor is pyridine.

4. The process of claim 1 wherein the acid acceptor is 2,6-lutidine.

5. The process of claim 1 wherein the liquid reaction medium is chlorobenzene.

6. The process of claim 1 wherein the liquid reaction medium is n-hexane.

7. The process of claim 1 wherein the liquid reaction medium is n-pentane.

8. The process of claim 1 wherein the liquid reaction medium is cyclohexane.

9. The process of claim 1 wherein the liquid reaction medium is acetonitrile.

* * * * *